(12) United States Patent
Saito et al.

(10) Patent No.: US 12,368,969 B2
(45) Date of Patent: Jul. 22, 2025

(54) IMAGING APPARATUS, ILLUMINATION APPARATUS, IMAGING SYSTEM, AND CONTROL METHOD

(71) Applicant: CANON KABUSHIKI KAISHA, Tokyo (JP)

(72) Inventors: Keiichiro Saito, Tokyo (JP); Yutaka Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/323,873

(22) Filed: May 25, 2023

(65) Prior Publication Data

US 2023/0396891 A1 Dec. 7, 2023

(30) Foreign Application Priority Data

Jun. 1, 2022 (JP) ................. 2022-089644

(51) Int. Cl.
*H04N 23/88* (2023.01)
*H04N 23/56* (2023.01)
*H04N 23/62* (2023.01)
*H04N 23/71* (2023.01)

(52) U.S. Cl.
CPC ............ *H04N 23/88* (2023.01); *H04N 23/56* (2023.01); *H04N 23/62* (2023.01); *H04N 23/71* (2023.01)

(58) Field of Classification Search
CPC ......... H04N 23/56; H04N 23/84; H04N 23/88
USPC .............................................. 348/223.1, 371
See application file for complete search history.

(56) References Cited

U.S. PATENT DOCUMENTS

| 9,420,248 | B2 * | 8/2016 | Velarde | G03B 7/17 |
| 2009/0256947 | A1 * | 10/2009 | Ciurea | G06F 3/04845 |
| | | | | 348/333.12 |
| 2024/0282020 | A1 * | 8/2024 | Williams | G06T 7/90 |

FOREIGN PATENT DOCUMENTS

| JP | 2007251902 A | * | 9/2007 |
| JP | 2007300541 A | | 11/2007 |

\* cited by examiner

*Primary Examiner* — Anthony J Daniels
(74) *Attorney, Agent, or Firm* — Canon U.S.A., Inc. IP Division (57) ABSTRACT

An imaging apparatus configured to capture an image using an illumination apparatus includes an image sensor, one or more processors, and a memory storing instructions which, when executed by the processors, cause the imaging apparatus to function as a selection unit configured to select a background color in response to a user's instruction, a processing unit configured to perform white balance processing on an image obtained by the image sensor by irradiating an object with illumination light, based on the background color selected by the selection unit, and a determination unit configured to determine an illumination color of the illumination light to be emitted from the illumination apparatus when the image sensor captures the image so that a color of the object irradiated with the illumination light in the image subjected to the white balance processing becomes a color different from the background color selected by the selection unit.

11 Claims, 5 Drawing Sheets

IMAGING APPARATUS, ILLUMINATION APPARATUS, IMAGING SYSTEM, AND CONTROL METHOD

BACKGROUND

Field

The present disclosure generally relates to imaging and, more particularly, to an imaging system including an imaging apparatus and an illumination apparatus.

Description of the Related Art

Heretofore, a technique, called color shift image capturing, has been known. The color shift image capturing is a technique of changing a color of a background or the like, which is not irradiated with illumination light, by performing a white balance setting based on the illumination light changed to a predetermined color by attaching an optical filter for changing the color of the illumination light at a front face of a light emitting portion of an illumination apparatus. In the color shift image capturing, the color of the background or the like can be changed while keeping the color of a main object to be a natural color by performing similar white balance settings on the main object, of which the ratio of the illumination light radiated thereon from the illumination apparatus is larger among total light radiated thereon, and the background, of which the ratio of ambient light radiated thereon is larger. It is possible to change a color of the background or the like after the background or the like are subjected to the white balance processing to a desired color, by changing the color of the optical filter.

As a technique for changing a color of illumination light emitted from an illumination apparatus, Japanese Patent Application Laid-open No. 2007-300541 discusses a technique of controlling a light emission unit, in a case where external light and light emitted from the light emission unit is mixed to irradiate the object, so as to obtain a same state as a state where the object is irradiated with natural light (white light).

SUMMARY

The present disclosure is directed to a technique for enabling a user to easily perform color shift image capturing.

According to some embodiments, an imaging apparatus configured to capture an image using an illumination apparatus includes an image sensor, one or more processors, and a memory storing instructions which, when executed by the one or more processors, cause the imaging apparatus to function as a selection unit configured to select a background color in response to a user's instruction, a processing unit configured to perform white balance processing on an image obtained by the image sensor by irradiating an object with illumination light emitted from the illumination apparatus, based on the background color selected by the selection unit, and a determination unit configured to determine an illumination color of the illumination light to be emitted from the illumination apparatus when the image sensor captures the image so that a color of the object irradiated with the illumination light emitted from the illumination apparatus in the image subjected to the white balance processing becomes a color different from the background color selected by the selection unit.

Further features of the present disclosure will become apparent from the following description of exemplary embodiments with reference to the attached drawings.

DESCRIPTION OF THE EMBODIMENTS

Figure 1:
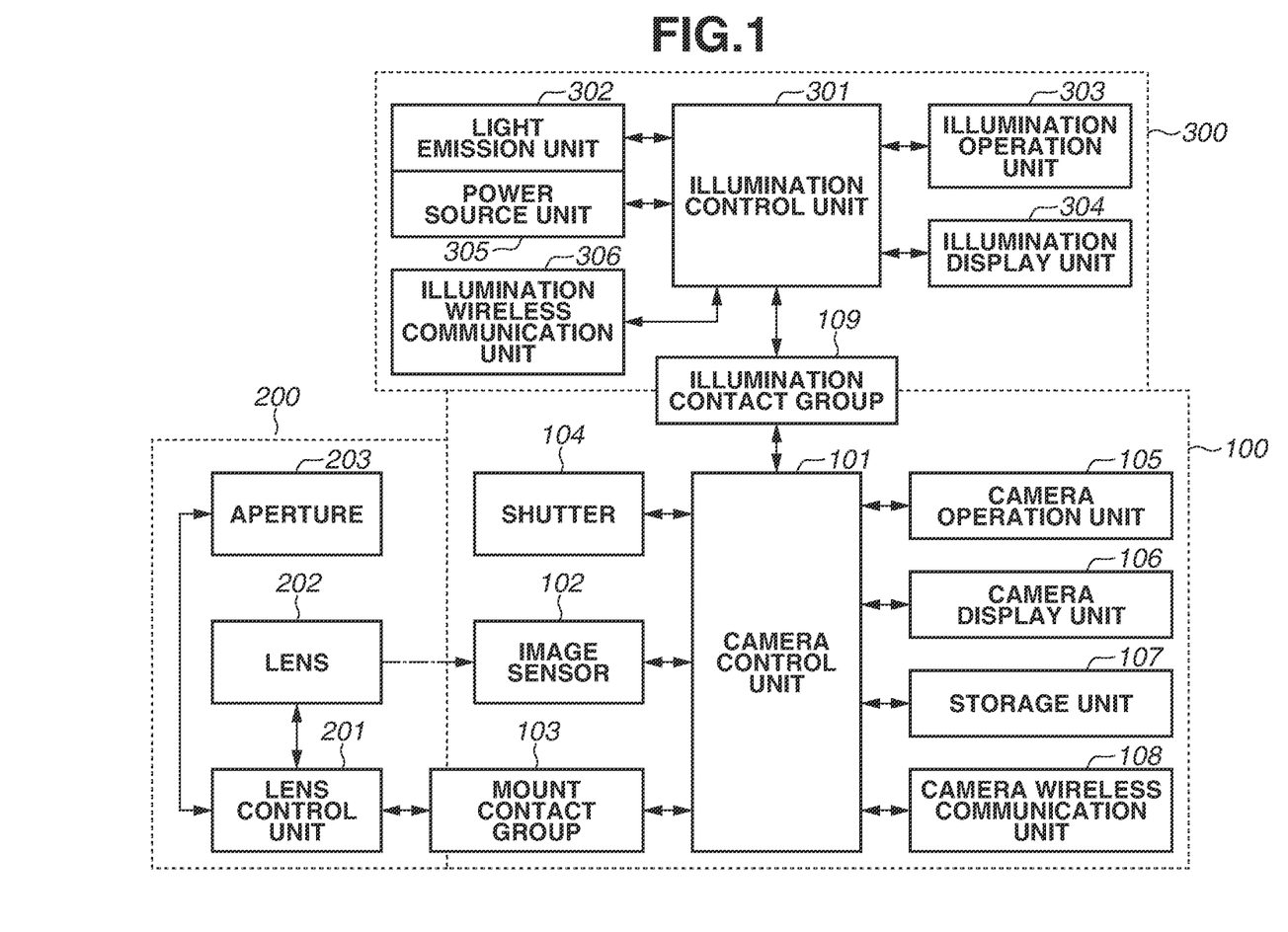
FIG. 1 is a block diagram schematically illustrating a configuration of an imaging system according to a first exemplary embodiment.

Hereinbelow, exemplary embodiments of the present disclosure will be described in detail with reference to the attached drawings. First, a first exemplary embodiment will be described. FIG. 1 is a block diagram schematically illustrating a configuration of an imaging system according to the first exemplary embodiment of the present disclosure. In the imaging system illustrated in FIG. 1, an imaging lens 200 and a light-emitting diode (LED) light 300 serving as an illumination apparatus are attached to a camera 100 serving as an imaging apparatus. The imaging lens 200 and the LED light 300 may be integrated with the camera 100. The illumination apparatus only needs to be capable of changing a color of illumination light, and may include an organic electroluminescence (EL) light, a flash light, or the like as a light source, capable of changing the color of the illumination light using an optical filter. The LED light 300 according to the present exemplary embodiment is configured to change the color of the illumination light by changing the emission ratio of a plurality of LEDs having different colors in the illumination light.

In FIG. 1, the imaging lens 200 is mounted on a front face of the camera 100. The imaging lens 200 is an interchangeable lens, and electrically connected to the camera 100 via a mount contact group 103. The LED light 300 is mounted on an accessory shoe located on an upper surface of the camera 100. The LED light 300 is an interchangeable light, and electrically connected to the camera 100 via an illumination contact group 109.

A camera control unit 101 is a microcomputer for controlling operation of each unit of the camera 100. The camera control unit 101 includes a built-in memory for storing various kinds of adjustment values and programs required for executing various kinds of controls. The built-in memory also plays a role of a buffer memory for temporarily storing various kinds of data processed by each unit.

An image sensor 102 converts light incident from an object through a lens 202 into an electrical signal, generates an image signal including a still image or a moving image, and outputs the image signal to the camera control unit 101.

A shutter 104 is arranged between the lens 202 and the image sensor 102, and operates in response to an instruction by the camera control unit 101. The shutter 104 includes a leading curtain and a trailing curtain. An exposure of the image sensor 102 starts by the leading curtain running to open the shutter 104, and the exposure of the image sensor 102 ends by the trailing curtain running to close the shutter 104. One of or both of the leading curtain and trailing curtain of the shutter 104 may be omitted, and instead, so-called an electronic shutter may perform the exposure control.

A camera operation unit 105 includes operation members operated by a photographer (hereinbelow, referred to as a user), and the camera operation unit 105 detects an operation performed by the user via a button, a switch, a dial, or a connected device, which are provided on the camera 100, and transmits a signal corresponding to an operation instruction, to the camera control unit 101. In a case of still image capturing, the camera operation unit 105 outputs to the camera control unit 101 an instruction signal (hereinbelow, referred to as a SW1 signal) to be issued when a user half presses a release button and an instruction signal (hereinbelow, referred to as a SW2 signal) to be issued when the user fully (deeply) presses the release button. In a case of moving image capturing, the camera operation unit 105 outputs to the camera control unit 101 an instruction signal (hereinbelow, referred to as a REC signal or a REC stop signal) to be issued when the user operates a recording button. Various settings of the camera 100 such as a mode setting are performed in response to the operation of the user to the camera operation unit 105.

A camera display unit 106 includes a liquid crystal panel or an organic EL panel, and displays image capturing information and a captured image in response to an instruction by the camera control unit 101.

The camera control unit 101 controls the operation of the camera 100 based on the output signal of the camera operation unit 105. In a case where the output signal of the camera operation unit 105 is the SW1 signal, the camera control unit 101 drives the image sensor 102 to capture an image, and outputs focus information such as a defocus amount of each focus detection area (auto-focus area). The camera control unit 101 repeats a light metering control to measure brightness of the object based on the image capturing result, and determines a shutter speed, an aperture value, and a sensitivity (International Organization for Standardization (ISO) sensitivity) to be used at a time of image capturing, based on the light metering result. In the present exemplary embodiment, a shutter speed, an aperture value, an ISO sensitivity used at a time of image capturing are collectively referred to as exposure control values. The determined exposure control values are displayed on a screen of the camera display unit 106. In a case where the output of the camera operation unit 105 is a SW2 signal, the camera control unit 101 drives an aperture 203 in the lens 202, sets the ISO sensitivity, and controls the shutter 104 to irradiate the image sensor 102 with incident light. In a case where the output signal of the camera operation unit 105 is a REC signal, the camera control unit 101 sets an ISO sensitivity and a frame rate, drives the image sensor 102 to capture a moving image, and outputs focus information such as a defocus amount of each focus detection area (auto-focus area). The camera control unit 101 repeats the light metering control for measuring the brightness of the object based on the image capturing result, to irradiate the image sensor 102 with incident light. A lens control unit 201 to be described below drives a focus lens (not illustrated) for adjusting focus of the lens 202, following an instruction of the camera control unit 101, to repeat an auto-focus (AF) operation. The camera control unit 101 performs a control of displaying a captured image on the screen of the camera display unit 106 based on the image obtained from the image sensor 102, and a control of storing the image (including an image with audio information) into a storage unit 107.

A camera wireless communication unit 108 is a unit for performing wireless communication between the camera 100 and an external apparatus, and, for example, transmits and receives data such as an image signal, an audio signal, image compression data, and audio compression data. In addition, the camera wireless communication unit 108 transmits and receives a control signal related to the image capturing such as an image capturing start command and an image capturing end command, settings, and operation command information. The camera wireless communication unit 108 is, for example, a wireless communication module such as an infrared communication module, a wireless local area network (LAN) communication module, and a wireless universal serial bus (USB) module.

A configuration of the imaging lens 200 will be described.

The lens control unit 201 is a microcomputer for controlling operation of each unit in the imaging lens 200.

The lens 202 includes one or more lenses including the focus lens for adjusting focus, and forms an object image on the image sensor 102. Further, the lens 202 includes the aperture 203 for adjusting an incident light amount. The lens control unit 201 adjusts the light amount entering the inside of the camera 100 and focus, following an instruction from the camera control unit 101, thorough the control via the mount contact group 103, and transmits lens information at that time to the camera control unit 101.

A configuration of the LED light 300 will be described.

An illumination control unit 301 is a microcomputer for controlling operation of each unit in the LED light 300. The illumination control unit 301 can communicate with the camera control unit 101 via the illumination contact group 109, receive a light emission control instruction and camera information from the camera 100, and transmit LED light information to the camera 100.

A light emission unit 302 includes a light emission circuit and a light emission optical system. The light emission optical system includes three types of LED light sources respectively having illumination colors of red (R), green (G), and blue (B), and an irradiation range adjustment mechanism for adjusting an irradiation range (irradiation angle) of the irradiation light. A known mechanism may be used as the irradiation range adjustment mechanism. The illumination control unit 301 instructs the light emission circuit to drive LED chips to emit light, and to irradiate the object with the light in a predetermined irradiation range through the light emission optical system. The illumination color can be changed by changing the emission ratio of three types of the LED light sources (R, G, and B). The colors of the LED light sources are not limited to the three colors of R, G, and B.

An illumination operation unit 303 includes operation members to be operated by a user, and detects the operation performed by the user via a button and a dial provided on the LED light 300 to transmit a signal corresponding to the operation instruction to the illumination control unit 301. The various kinds of settings such as a mode setting of the LED light 300 are performed, based on the operation performed by the user on the illumination operation unit 303.

An illumination display unit 304 displays a light emission mode in response to an instruction by the illumination control unit 301.

A power source unit 305 supplies energy for generating illumination light for irradiating an object to be captured therewith, using power of a battery mounted on the LED light 300. Information about the power supply including a remaining battery charge amount is controlled by the illumination control unit 301 and transmitted to the camera control unit 101 via the illumination contact group 109.

Like the camera wireless communication unit 108, an illumination wireless communication unit 306 is used to perform wireless communication between the LED light 300 and an external apparatus (e.g., camera 100), and transmits and receives various settings of, for example, a light emission amount, a light emission color, and an irradiation range, and operation commands. The illumination wireless communication unit 306 is, for example, a wireless communication module such as an infrared communication module, a wireless LAN communication module, and a wireless USB module.

The emission amount, the emission color, and the irradiation range of the light emission unit 302 may be set via the illumination operation unit 303. Alternatively, they may be obtained from the camera control unit 101 through communication via the illumination contact group 109, or the camera wireless communication unit 108 and the illumination wireless communication unit 306. The illumination control unit 301 can receive a control signal from the camera control unit 101 via the illumination contact group 109, and cause the light emission unit 302 to emit light with a predetermined light emission amount, a light emission color, and an irradiation range, in conjunction with the image capturing operation of the camera 100. In the case where the emission amount, the emission color, and the irradiation range of the light emission unit 302 are obtained from the camera control unit 101 through communication, it is possible to set them automatically by the camera control unit 101, or through the operation via the camera operation unit 105.

Figure 2:
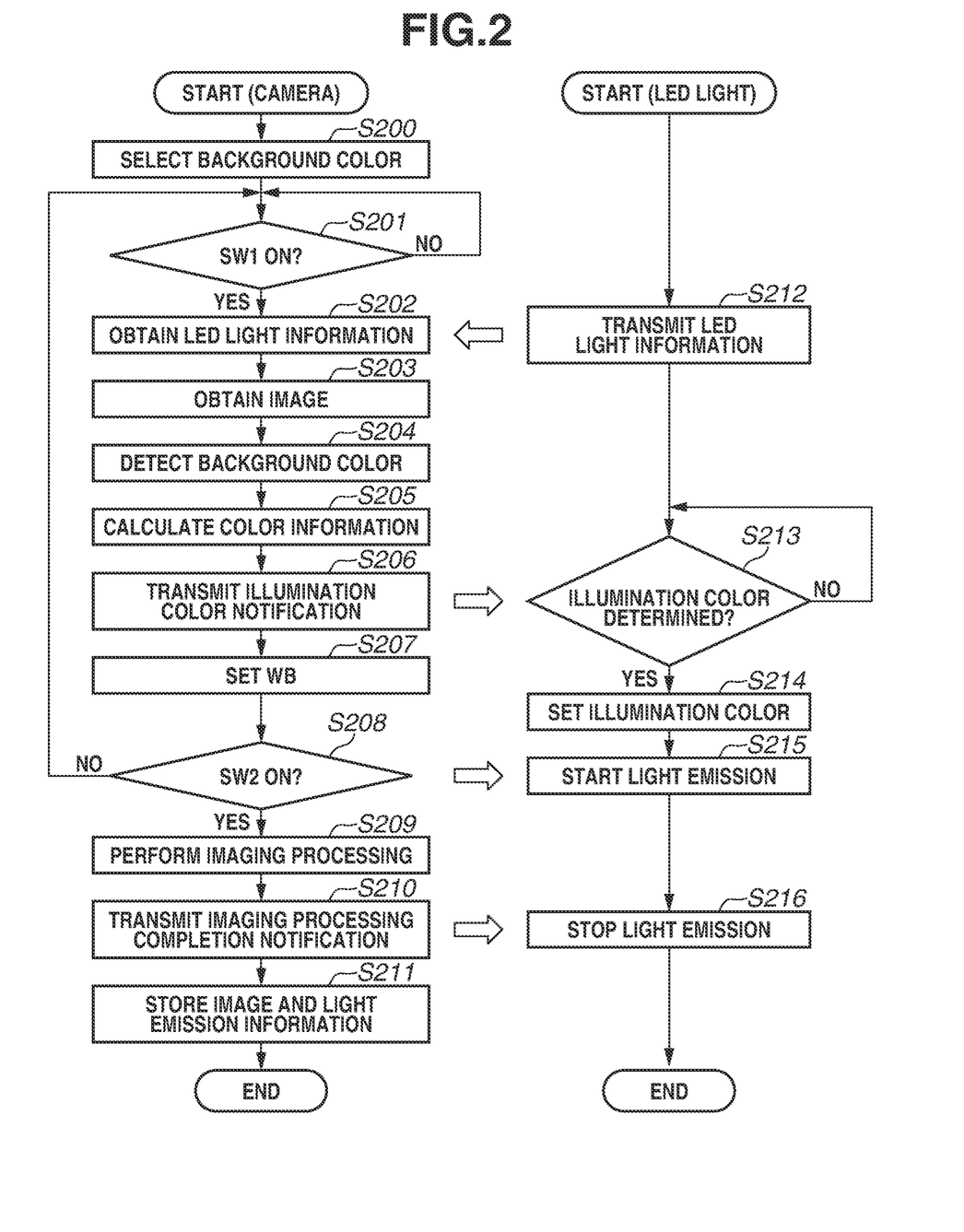
FIG. 2 is a flowchart illustrating an image capturing operation according to the first exemplary embodiment.

With reference to FIG. 2, operation of the imaging system according to the present exemplary embodiment will be described. FIG. 2 is a flowchart illustrating an example of a still image capturing operation using the camera 100 and the LED light 300. When a main power switch of the camera 100 included in the camera operation unit 105 is turned on, power is supplied to each block of the camera 100 from a battery (not illustrated), initialization and reading of various kinds of settings are performed, and an image capturing operation is prepared. A main power switch of the LED light 300 included in the illumination operation unit 303 is turned on, power is supplied to each block of the LED light 300 from the power source unit 305, initialization and reading of various kinds of settings are performed, and an image capturing operation is prepared. The power may be supplied to the LED light 300 from the camera 100 via the illumination contact group 109.

In step S200, the camera control unit 101 displays a background color selection screen on the camera display unit 106 to allow a user to operate the camera operation unit 105 to select a desired background color. The background color selection screen will be described below.

In step S201, the camera control unit 101 monitors a state of the SW1 signal.

When the SW1 is on (YES in step S201), the processing proceeds to step S202. When the SW1 is not on (NO in step S201), the processing in step S201 may be repeated, or may return to step S200 to update the background color selection.

In step S202, the camera control unit 101 obtains various kinds of information from the illumination control unit 301 of the LED light 300 via the illumination contact group 109. In step S212, the illumination control unit 301 transmits the various kinds of information to the camera 100 via the illumination contact group 109. The information obtained at this time includes information indicating, for example, a maximum light emission amount, light emission-possible colors (illumination colors of illumination light that can be emitted), a light irradiation-possible range, and a battery state, of the LED light 300.

In step S203, the camera control unit 101 instructs each unit to perform imaging processing to obtain an image for measuring brightness used for auto exposure (AE) control. At this time, the lens control unit 201 performs AF operation by driving the focus lens in the lens 202 based on an instruction received from the camera control unit 101 via the mount contact group 103.

In step S204, the camera control unit 101 detects background color information from the image obtained from the image sensor 102 in step S203 (color information detection). As a method for detecting the background color, a method of discriminating a background by determining a main object by using a known technique such as a distance map, exposure information, and a pattern matching may be employed. For example, the background color is detected from information about, for example, a hue ratio of the color information obtained from the range determined to be the background.

In step S205, the camera control unit 101 calculates a white balance (WB) of the camera 100 and color information for the illumination color setting so that the background color detected in step S204 becomes a color equivalent to the color selected in step S200. The calculation of the color information will be described below.

In step S206, the camera control unit 101 determines an illumination color of the illumination light to be emitted from the light emission unit 302 based on the color information calculated in step S205, and notifies the illumination control unit 301 of the determined illumination color. After the processing in step S212, the processing proceeds to step S213. In step S213, the illumination control unit 301 determines whether the illumination color is determined. In step S213, the illumination control unit 301 determines whether the notification of the illumination color is received from the camera control unit 101 (whether the illumination color is determined). If the notification in step S206 is received (YES in step S213), the processing proceeds to step S214. In step S214, the illumination control unit 301 updates the setting of the illumination color. There is a possibility that the illumination color of the illumination light to be emitted from the light emission unit 302 based on the color information calculated in step S205 is not an illumination color of the illumination light that can be emitted from the light emission unit 302. In such a case, the camera control unit 101 determines a color closest to the illumination color of the illumination light to be emitted from the light emission unit 302 determined based on the color information calculated in step S205, from among the illumination colors that can be emitted by the light emission unit 302, as the illumination color of the illumination light to be emitted from the light emission unit 302, and notifies the illumination control unit 301 of the determined color. Alternatively, the illumination control unit 301 sets a color closest to the illumination color sent from the camera control unit 101 from among the illumination colors of the illumination light that can be emitted by the light emission unit 302, as an illumination color of the illumination light to be emitted from the light emission unit 302.

In step S207, the camera control unit 101 performs a WB setting based on the color information calculated in step S205.

In step S208, the camera control unit 101 monitors a state of the SW2 signal, and when the SW2 turns on (YES in step S208), the processing proceeds to step S209. On the other hand, when the SW2 is off (NO in step S208), the processing proceeds to step S201, and the camera control unit 101 repeats the processing from steps S201 to S207, until the SW2 turns on. When the SW2 turns on (YES in step S208), the camera control unit 101 notifies the illumination control unit 301 of a light emission start.

Upon receiving the notification from the camera control unit 101 in step S208, in step S215, the illumination control unit 301 causes the light emission unit 302 to start emitting light in the illumination color set in step S214.

In step S209, the camera control unit 101 instructs each unit to perform imaging processing, and starts an exposure of the image sensor 102. In the imaging processing, the camera control unit 101 controls an exposure control value or a light emission amount of the light emission unit 302 so that an image to be obtained is appropriately exposed. Some of or all of the settings of the exposure control value or the light emission amount of the light emission unit 302 may be manually set via the camera operation unit 105 and the illumination operation unit 303.

In step S209, as part of the imaging processing, the camera control unit 101 performs the WB processing on the image obtained from the image sensor 102 based on the WB setting set in step S207. After the completion of the imaging processing, the processing proceeds to step S210.

In step S210, the camera control unit 101 notifies the illumination control unit 301 of the completion of the imaging processing. Upon receiving the notification from the camera control unit 101 in step S210, in step S216, the illumination control unit 301 stops the light emission unit 302 from emitting the light.

In step S211, the camera control unit 101 stores the image obtained in step S209 in the storage unit 107. At this time, the camera control unit 101 stores the light emission information and the like of the camera 100, the imaging lens 200, and the LED light 300 together with the image, as exchangeable image file format (Exif) data. After the image is stored, a series of the imaging operations ends.

Figure 3:
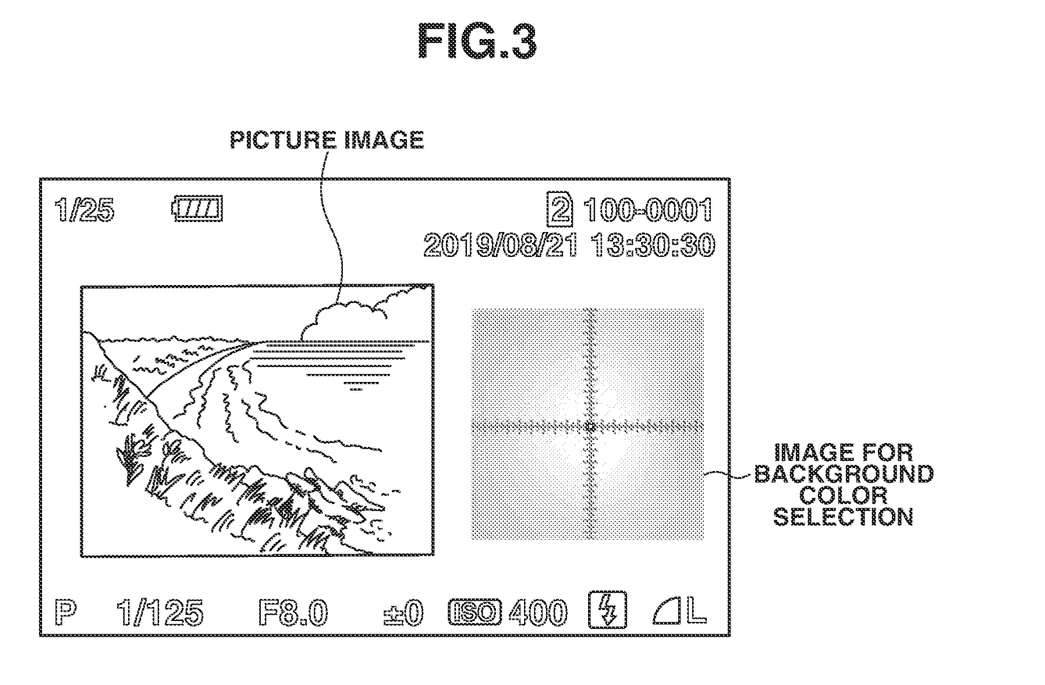
FIG. 3 is a diagram illustrating a display screen displayed when a background color is selected, according to the first exemplary embodiment.

With reference to FIG. 3, a specific example of the background color selection performed in step S200 will be described. FIG. 3 is a diagram illustrating an example of a selection screen displayed on the camera display unit 106 when the background color is selected in step S200. In the example in FIG. 3, a picture image is displayed on the left side in the screen, and, an image for the background color selection such as hue information or a chromatic coordinate system is displayed on the right side in the screen. A user selects a desired background color by moving a position of a black circle displayed on the image for the background color selection by operating an electric dial or the like included in the camera operation unit 105, while watching the position of the black circle and the picture image at that time, displayed on the image for the background color selection. The instruction method by the user in selecting the background color is not limited to the operation on the electric dial, and a known method such as a voice input or a line-of-sight input may be used. The image for the background color selection may be configured to display background colors using characters of Red, Green, and Blue as candidates, and the user may select a desired background color by selecting a desired color from among the displayed characters.

A specific example of the color setting calculation performed in step S205 will be described. In the present exemplary embodiment, in step S215, the light emission unit 302 irradiates the main object with the light of a color equivalent to the complementary color (complementary color or close to the complementary color) of the background color selected in step S200, and the camera control unit 101 performs the WB processing using the WB setting set in step S207. As described above, the WB processing is performed so that the background color becomes the color selected by the user, and the change of the color of the main object due to the WB processing and the change of the color of the main object due to the illumination color of the illumination light are canceled, in such a way that the main object has natural colors. In other words, it is only necessary to calculate values of R', G', and B' that are respectively the complementary colors of the R, G, and B, based on the values R, G, and B of the background color selected in step S200, and determine the color of the illumination light to be emitted from the light emission unit 302.

As a known method of obtaining a complementary color, it is generally known that a complementary color is obtained by subtracting each of values of R, G, and B from a sum of a maximum value in R, G, and B and a minimum value in R, G, and B. More specifically, the complementary color is obtained using the following equation.

$R'=$(maximum value in $RGB$,+minimum value in $RGB$)$-R$ $G'=$(maximum value in $RGB$,+minimum value in $RGB$)$-G$ $B'=$(maximum value in $RGB$,+minimum value in $RGB$)$-B$ [Equation 1]

The color of the main object irradiated with the illumination light returns to its natural color through the WB setting, by determining the illumination color of the illumination light to be emitted from the light emission unit 302 in step S213 using the colors obtained based on the Equation 1, and the WB setting in step S207. On the other hand, the color of the background not irradiated with the illumination light becomes a color equivalent to the background color selected in step S200 due to the influence of the WB setting. At this time, it is possible to make the processing of the illumination color setting easier by matching the processing bit number of RGB of the image captured by the image sensor 102 and the control bit number of the RGB LEDs of the light emission unit 302. In the present exemplary embodiment, the color of the illumination light is described using the RGB method, but may be calculated with another method such as a Hue, Lightness, and Saturation (HLS) color space.

According to the present exemplary embodiment, a user can easily perform color shift image capturing by selecting a desired background color. In the present exemplary embodiment, the color shift image capturing of the still image is described, but the color shift image capturing of the moving image can be similarly performed, because the object can be irradiated with constant light from the LED light 300.

Figure 4:
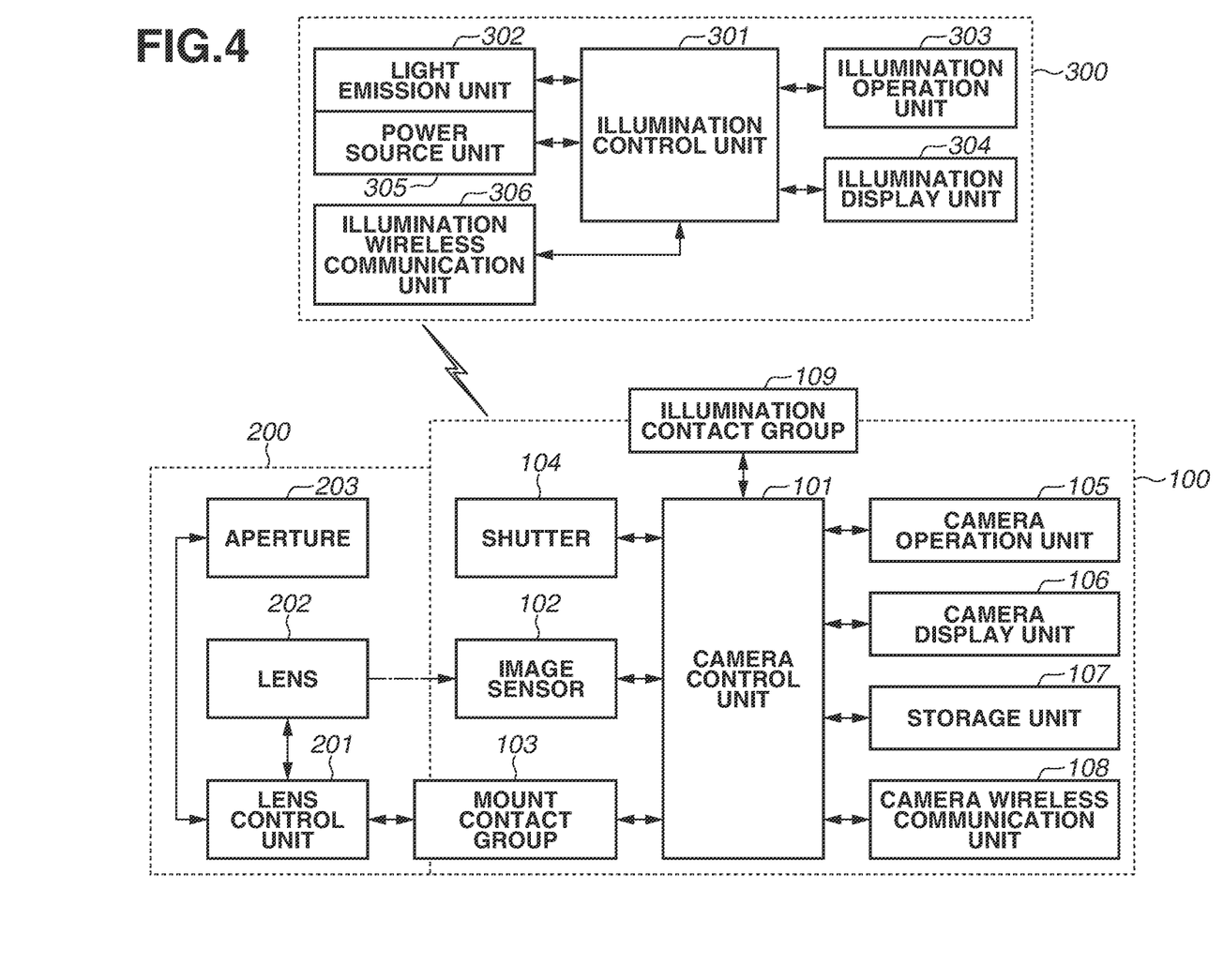
FIG. 4 is a block diagram schematically illustrating a configuration of an imaging system according to a second exemplary embodiment.
Figure 5:
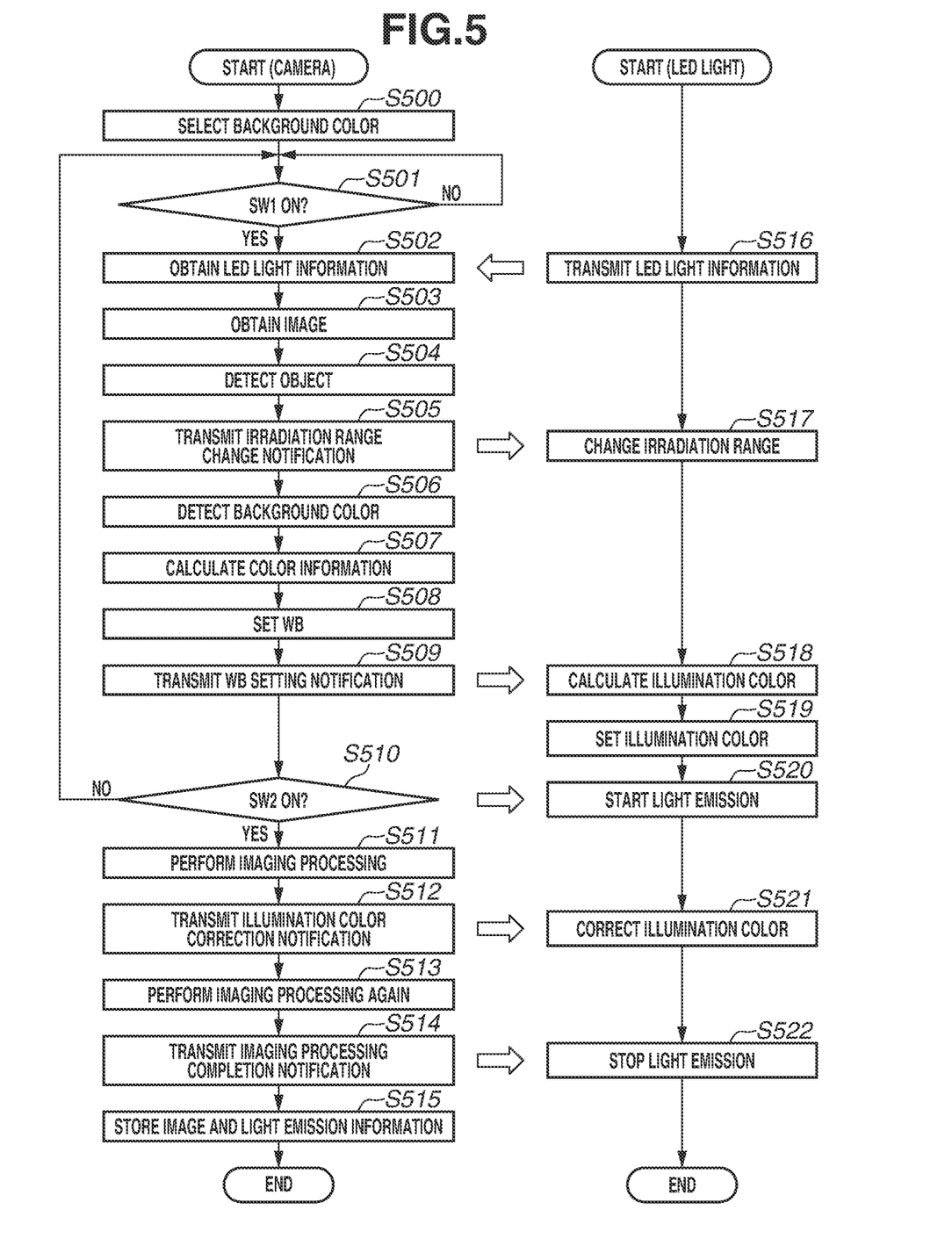
FIG. 5 is a flowchart illustrating an image capturing operation according to the second exemplary embodiment.

With reference to FIGS. 4 and 5, operation of an imaging system according to a second exemplary embodiment will be described. FIG. 4 illustrates a state where the LED light 300 illustrated in FIG. 1 is removed from the accessory shoe of the camera 100, and the LED light 300 and the camera 100 are wirelessly connected through the camera wireless communication unit 108 and the illumination wireless communication unit 306. In FIG. 5, operations performed in steps S500 to S503, S514, S515, S516, and S522, and the operations performed in steps S200 to S203, S210, S211, S212, and S216 are respectively the same, and the descriptions thereof are omitted.

The present exemplary embodiment is different from the first exemplary embodiment in that the LED light 300 is not physically connected with the camera 100, and is included in the imaging system as an independent illumination apparatus. The present exemplary embodiment is also different from the first exemplary embodiment in that the illumination color of the illumination light to be emitted from the light emission unit 302 is calculated by the illumination control unit 301. In the present exemplary embodiment, an example in which the imaging system includes one illumination apparatus will be described, but a plurality of illumination apparatuses that can irradiate an object at a same time may be used in combination through a wireless connection.

In step S504, the camera control unit 101 detects a predetermined main object using the image obtained from the image sensor 102 in step S503 (object detection). The camera control unit 101 calculates an irradiation range, including the main object in the image, of the light emission unit 302 of the LED light 300 based on the detection result of the main object. As a detection method of the predetermined main object, a known technique such as a face detection, a pupil detection, a moving object detection, a pattern matching, and a distance map may be used.

In step S505, the camera control unit 101 notifies the illumination control unit 301 of the irradiation range calculated in step S504, via the camera wireless communication unit 108 and the illumination wireless communication unit 306. Upon receiving the notification from the camera control unit 101 in step S505, in step S517, the illumination control unit 301 drives the irradiation range adjustment mechanism in the light emission unit 302 so that the irradiation range matches the irradiation range received from the camera control unit 101 in step S517.

In step S506, the camera control unit 101 detects the background color information using the image obtained by the image sensor 102 in step S503. As a detection method for detecting the background color, a method similar to the method used in step S204 may be used.

In step S507, the camera control unit 101 calculates color information about the WB of the camera 100 so that the background color detected in step S506 becomes a color equivalent to the color selected in step S500.

In step S508, the camera control unit 101 performs a WB setting based on the color information calculated in step S507.

In step S509, the camera control unit 101 notifies the illumination control unit 301 of information (WB setting information) regarding the WB setting set in step S508, via the camera wireless communication unit 108 and the illumination wireless communication unit 306. In step S518, the illumination control unit 301 calculates (determines) color information about the illumination color setting of the light emission unit 302 so that the main object has a natural color for the WB setting information received from the camera control unit 101. A method similar to the method used in step S205 may be used as a calculation method of the color information.

In step S519 subsequent to step S518, the illumination control unit 301 performs an illumination color setting of the light emission unit 302 so that the illumination color becomes the illumination color calculated in step S518.

In step S510, the camera control unit 101 monitors a state of the SW2 signal, and when the SW2 turns on (YES in step S510), the processing proceeds to step S511. On the other hand, when the SW2 signal is off (NO in step S510), the processing proceeds to step S501, and the camera control unit 101 repeats the processing from steps S501 to S509, until the SW2 turns on. When the SW2 turns on (YES in step S510), the camera control unit 101 notifies the illumination control unit 301 of a light emission start.

Upon receiving the notification from the camera control unit 101 in step S510, in step S520, the illumination control unit 301 causes the light emission unit 302 to start emitting light in the illumination color set in step S519.

In step S511, the camera control unit 101 instructs each unit to perform imaging processing, and starts an exposure of the image sensor 102. At this time, in a case where the information for each color (e.g., RGB information) of the image obtained by the image sensor 102 and subjected to the WB processing is different from the result at the detection time of the predetermined main object obtained in step S504, the camera control unit 101 calculates the difference amount of the color information. The camera control unit 101 calculates correction information for the illumination color of the illumination light emitted from the light emission unit 302. This is because the color information of the main subject is essentially targeted to make the color information of the main subject match color information equivalent to the color information of the main subject detected in step S504, based on the combination of the WB setting set in step S508 and the illumination color setting set in step S519. The camera control unit 101 calculates an illumination color correction amount, and advances the processing to step S512. In a case where the difference amount of the color information is within a predetermined range, the calculation of the illumination color correction information in step S511, and the subsequent processing to be performed in steps S512, S513, and S522 are omitted.

In step S512, the camera control unit 101 notifies the illumination control unit 301 of the illumination color correction information calculated in step S511, via the camera wireless communication unit 108 and the illumination wireless communication unit 306. Upon receiving the notification from the camera control unit 101 in step S512, in step S521, the illumination control unit 301 corrects the color information of the illumination color setting of the light emission unit 302 based on the illumination color correction information received from the camera control unit 101.

In step S513, the camera control unit 101 instructs each unit again to perform imaging processing, and starts an exposure of the image sensor 102.

According to the present exemplary embodiment, a user can easily perform a color shift image capturing by selecting a desired background color.

The operations described above with reference to the two exemplary embodiments may be executed in a case where a specific mode such as a color shift mode different from a normal mode is set on at least any one of the camera 100 and the LED light 300. In such a configuration, for example, the camera control unit 101 may perform mode determination processing before the processing in step S200 or step S500, and advance the processing to step S200 or step S500 if it is determined that the color shift mode is set.

In the two exemplary embodiments described above, the illumination control unit 301 may perform part of the operation performed by the camera control unit 101, or the camera control unit 101 may perform part of the operation performed by the illumination control unit 301. A light emission control accessory without an emission unit provided therein may perform part of the operation performed by the camera control unit 101 or the illumination control unit 301, and transmit the information about the illumination color calculated by the light emission control accessory to the LED light 300.

Each of the flowcharts described in the two exemplary embodiments is merely an example, and the various kinds of processing may be performed in an order different from the order in each of the flowcharts described above, as appropriate.

The exemplary embodiments of the present disclosure are described above, but the present disclosure is not limited to those exemplary embodiments, and can be modified and changed in various manners within the scope of the present disclosure. For example, a "smartphone with a camera function" or a "head mounted display with a camera built-in" that can be wirelessly connected with the LED light 300 may be used, instead of the camera 100 as the imaging apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-089644, filed Jun. 1, 2022, which is hereby incorporated by reference herein in its entirety.

What is claimed is:

1. An imaging apparatus configured to capture an image using an illumination apparatus, the imaging apparatus comprising:
   an image sensor;
   one or more processors; and
   a memory storing instructions which, when executed by the one or more processors, cause the imaging apparatus to function as
   a selection unit configured to select a background color in response to a user's instruction,
   a processing unit configured to perform white balance processing on an image obtained by the image sensor by irradiating an object with illumination light emitted from the illumination apparatus, based on the background color selected by the selection unit, and
   a determination unit configured to determine an illumination color of the illumination light to be emitted from the illumination apparatus when the image sensor captures the image so that a color of the object irradiated with the illumination light emitted from the illumination apparatus in the image subjected to the white balance processing becomes a color different from the background color selected by the selection unit.

2. The imaging apparatus according to claim 1, wherein the determination unit determines a color of a complementary color or near the complementary color of the background color selected by the selection unit to be the illumination color of the illumination light to be emitted from the illumination apparatus when the image is captured by the image sensor.

3. The imaging apparatus according to claim 1, further comprising:
   an object detection unit configured to detect a main object from an image, captured without the illumination light, obtained by the image sensor; and
   a calculation unit configured to calculate an irradiation range of the illumination light to be emitted from the illumination apparatus, based on a detection result of detection by the object detection unit.

4. The imaging apparatus according to claim 1, further comprising a color information detection unit configured to detect background color information from an image, captured without the illumination light-image, obtained by the image sensor,
   wherein the processing unit performs the white balance processing based on the background color information detected by the color information detection unit and the background color selected by the selection unit.

5. The imaging apparatus according to claim 1, further comprising an obtaining unit configured to obtain information indicating an illumination color of the illumination light emittable by the illumination apparatus,
   wherein the determination unit determines the illumination color of the illumination light to be emitted from the illumination apparatus when the image sensor obtains the image, based on the information indicating the illumination color obtained by the obtaining unit and the background color selected by the selection unit.

6. The imaging apparatus according to claim 1, further comprising a display unit configured to display a picture image corresponding to the background color selected by the selection unit.

7. An illumination apparatus configured to communicate with the imaging apparatus of claim 1, the illumination apparatus comprising:
   one or more processors; and
   a memory storing instructions which, when executed by the one or more processors, cause the illumination apparatus to function as
   an illumination unit configured to change an illumination color.

8. An imaging system comprising:
   an image sensor;
   one or more processors; and
   a memory storing instructions which, when executed by the one or more processors, cause the imaging system to function as
   an illumination unit configured to change an illumination color;
   a selection unit configured to select a background color in response to a user's instruction;
   a processing unit configured to perform white balance processing on an image obtained by the image sensor by irradiating an object with illumination light emitted from the illumination unit, based on the background color selected by the selection unit; and
   a determination unit configured to determine the illumination color of the illumination light to be emitted from the illumination unit when the image sensor captures the image so that a color of the object irradiated with the illumination light emitted from the illumination unit in the image subjected to the white balance processing becomes a color different from the background color selected by the selection unit.

9. A control method for an imaging apparatus configured to capture an image using an illumination apparatus, the control method comprising:
   selecting a background color in response to a user's instruction;
   performing white balance processing on an image obtained by an image sensor of the imaging apparatus by irradiating an object with illumination light emitted from the illumination apparatus, based on the selected background color; and
   determining an illumination color of the illumination light to be emitted from the illumination apparatus when the image sensor captures the image so that a color of the object irradiated with the illumination light emitted from the illumination apparatus in the image subjected to the white balance processing becomes a color different from the selected background color.

10. A control method for an illumination apparatus configured to communicate with the imaging apparatus according to claim 1, the method comprising:
   changing an illumination color of illumination light to be emitted from the illumination apparatus, based on information received from the imaging apparatus.

11. A control method for an imaging system including an image sensor and an illumination unit configured to change an illumination color of illumination light to be emitted from the illumination unit, the control method comprising:
   selecting a background color in response to a user's instruction;
   performing white balance processing on an image obtained by the image sensor by irradiating an object with the illumination light emitted from the illumination unit, based on the selected background color; and
   determining the illumination color of the illumination light to be emitted from the illumination unit when the image sensor captures the image so that a color of the object irradiated with the illumination light emitted from the illumination unit in the image subjected to the white balance processing becomes a color different from the selected background color.

* * * * *